United States Patent
Pao

(10) Patent No.: US 8,284,681 B2
(45) Date of Patent: Oct. 9, 2012

(54) EXPANDABLE NETWORK SYSTEM AND REDUNDANT METHOD FOR THE SAME

(75) Inventor: Chih-Hsiung Pao, Sindian (TW)

(73) Assignee: Etherwan Systems, Inc., Sindian (TW)

( * ) Notice: Subject to any disclaimer, the term of this patent is extended or adjusted under 35 U.S.C. 154(b) by 302 days.

(21) Appl. No.: 12/791,178

(22) Filed: Jun. 1, 2010

(65) Prior Publication Data
US 2011/0292831 A1    Dec. 1, 2011

(51) Int. Cl.
H04L 12/26    (2006.01)
H04L 12/28    (2006.01)

(52) U.S. Cl. ......................... 370/244; 370/401

(58) Field of Classification Search .......... 370/216–218, 370/242–245, 400–406
See application file for complete search history.

(56) References Cited

U.S. PATENT DOCUMENTS

| | | | | |
|---|---|---|---|---|
| 8,174,963 B2* | 5/2012 | Tochio | | 370/217 |
| 2004/0190454 A1* | 9/2004 | Higasiyama | | 370/238 |
| 2007/0242602 A1* | 10/2007 | Pang et al. | | 370/216 |
| 2008/0002570 A1* | 1/2008 | Kurokawa et al. | | 370/219 |
| 2008/0025203 A1* | 1/2008 | Tallet | | 370/216 |
| 2008/0304428 A1* | 12/2008 | Stilling et al. | | 370/256 |
| 2011/0317555 A1* | 12/2011 | Kleineberg et al. | | 370/230 |

* cited by examiner

*Primary Examiner* — Hong Cho
(74) *Attorney, Agent, or Firm* — C. G. Mersereau; Nikolai & Mersereau, P.A.

(57) ABSTRACT

Disclosed are an expandable network system and a redundant method applied to the system. According to one embodiment, the network system may be a ring-type or linear-type network system. A plurality of network nodes form one or more sub-networks. Many interconnected sub-networks form another network. While the network system is initialized, the method defines the role of each network port of each network node in each sub-network. Concurrently, every network port interconnected between the sub-networks is also defined to be a blocked port or a forward port. This mechanism defining the role of each port not only prevents the possible broadcast storm occurred in the network system, but also modifies the network signaling path by re-defining the roles of the ports while the connection changes. Therefore, the expandable network system and the method achieve a fast-redundant connection scheme, and the more flexible network-expanding function.

20 Claims, 5 Drawing Sheets

EXPANDABLE NETWORK SYSTEM AND REDUNDANT METHOD FOR THE SAME

BACKGROUND OF THE INVENTION

1. Field of the Invention

The present invention relates to an expandable network system and a redundant method for the same, in particular, the network system is formed with one or more sub-networks, and each sub-network has a plurality of network nodes. The system accomplishes fast redundancy by defining the role of each port, and re-defining the roles as the network system changes.

2. Description of Related Art

With growing of widespread applications of networks, the network safety and reliability is continually becomes more and more important, this is particularly so with ring-type networks for special applications. To avoid any interruption resulting from any unexpected event to the network, or to any connection failure of network device's damage, the conventional technology provides some schemes for redundancies.

In practice, at least one network switch is disposed on each node in a local area network for some applications or some other networks for industrial automatic systems. The relevant network devices in the network may be accessed via the network switch. Those network devices can be the networking devices, such as an industrial controller for an industrial automatic system, a conventional computer and a server. In which, an operator may perform a remote control or maintenance through the industrial controller.

Topological types for a variety of network architectures include linear-type, ring-type, bus-type, star-type, mesh-type, and tree-type. The ring-type network is configured to link the nodes in the network in series, and the first node is closed to the last one. Each node in the ring-type network may be communicated with any other node in the network through a ring-type transmission route. However, the transmitted data may be looped in the ring-type network circularly. New arrived data may not be delivered if old data is looped in the ring and occupying the bandwidth. The circular looping data may paralyze the network since it generates broadcast storm. One of the solutions to the program is to set a blocked port on a node in the ring-type network. This blocked port disallows the data to pass, and the mentioned looping data may not be endless.

Further, due to the inherent property of the ring-type network, it may be damaged as one of the nodes in the ring fails. The other nodes are also affected, and even meeting an overall failure. Therefore, it is very important to ensure the connectivity of the network. The conventional redundant scheme for the ring-type network is such as a Rapid Spanning Tree Protocol (RSTP) algorithm, which is used for stabilizing the data routing. According to the RSTP algorithm, when the blocked port is aware of any node or route damages, the predefined blocked port is transformed into a forward port, which allows the data to pass. The RSTP algorithm makes the whole system stay without obstruction. As long as the failed node or route recovers, the system can be restored to the initial state.

Regarding a redundant technology to a ring-type network with multiple rings, a conventional scheme provides a redundant scheme for the ring-type network shown in FIG. 1.

A plurality of network nodes 101, 102, 103, 104, 105, 106 shown in the drawing are separated to form two ring-type networks 11, 12. The two ring-type networks 11, 12 are interconnected over two connections 13, 14. The connection 13 is served by a network node 101 and the other network node 104. The connection 14 is made by interconnecting a network node 103 and a network node 106. In a normal operation, a major connection 13, for example, is regarded as the major route for delivering packets. If any connection meets abnormal situation, such as being broken, failure of node, a redundant connection 14, for example, will be immediately activated. The port states of nodes on each connection may also be changed in order to prevent any interruption of communication between the two ring-type networks 11, 12.

Since it needs time to repair the damaged route or restore the initial state in the above-mentioned technology, the conventional RSTP algorithm for switching the port state may not be quick enough. Therefore, the lost packets during the time to switch the port state may be many and conduct whole system's failure.

SUMMARY OF THE INVENTION

To distinguish the conventional technologies, the present invention provides a fast-redundancy and expandable network framework. According to one of the embodiments of the invention, provided is an expandable network system which may be a ring-type or linear-type network topologies. The network system has a plurality of sub-networks having a plurality of network nodes. The sub-networks are preferably interconnected to form one ring-type topology network. On account of the port definitions of the network nodes, the mechanism of achieves fast redundancy and capability of expansion in addition to avoid the broadcast storm within the ring. In comparison with the conventional technology which issues a signal to the initial blocked port, the invention saves lots of time to deliver the signal, reduces lost packets, and enhances the system stability.

The above-mentioned network node has at least two network connection ports connected with other network nodes. The network nodes are interconnected to form one sub-network. Two of the interconnected sub-networks may form an expandable ring-type or linear-type network system.

More particularly, the network connection ports of each network node in a sub-network are defined as one blocked port and some other forward ports as the network system is initialized. According to one embodiment, media access control (MAC) addresses of the interconnected network connection ports become a point of reference for defining the blocked port and the rest forward ports. Furthermore, each network node, during the operation, will detect each port's connection status. When any change of the connection occurs, such as failure of connection, failure of device, or connection modification, the port role of each network connection port is re-defined. For example, the initial blocked port may be transformed to a forward port as the change is detected.

The present invention further provides a redundancy method adapted to the above described expandable network system. The first step in the method is to establish a sub-network with a plurality of network nodes. A plurality of sub-networks are interconnected to form the expandable network system. After an initializing step for the network system, the port roles of the network nodes in each sub-network are defined. The port roles can be one blocked port and some other forward ports.

In addition to define the port roles in each sub-network, the port roles of the network connection ports of the one or more network nodes interconnected among the sub-networks may also be defined as the blocked port or forward port.

In operation of the network system, the connection status is a point of reference to determine if any change occurs. The change of connection means failure of connection, failure of device, or connection modification. The change may cause problem to the connection. Meanwhile, since one connection between the network nodes changes, other network nodes may be informed. The port roles of the network connection ports may be re-defined by referring to the connection relationship and the media access control (MAC) address of each port. Or alternatively, the port roles of the network connection ports between the sub-networks may also be re-defined. In the meantime, the routing for each network packet will be modified in order to avoid the portion of problem. Therefore, a redundant route is made.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

While the present invention will be described more fully hereinafter with reference to the accompanying drawings, in which a preferred embodiment(s) of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
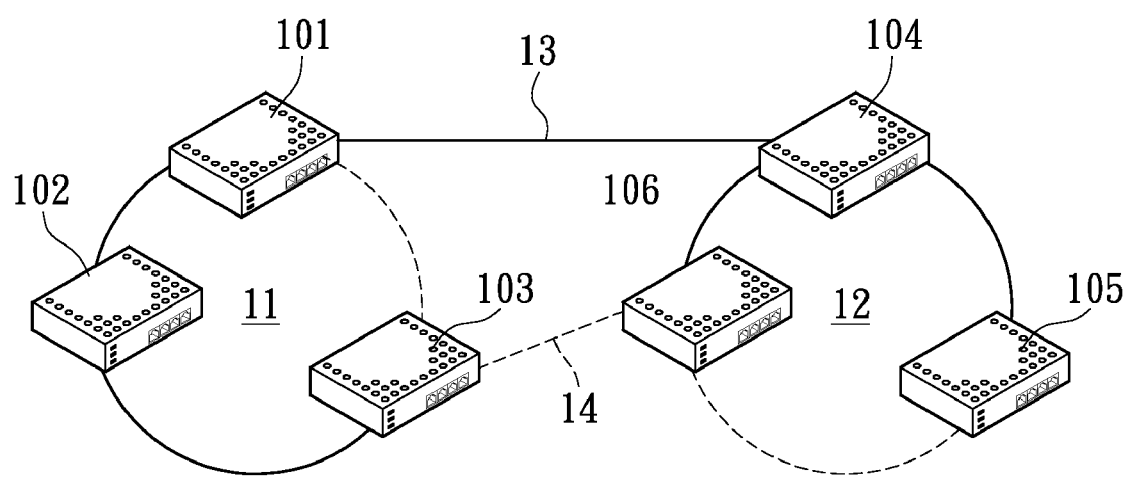
FIG. 1 shows a schematic diagram of a ring-type network with redundancy according to conventional technology.
Figure 2:
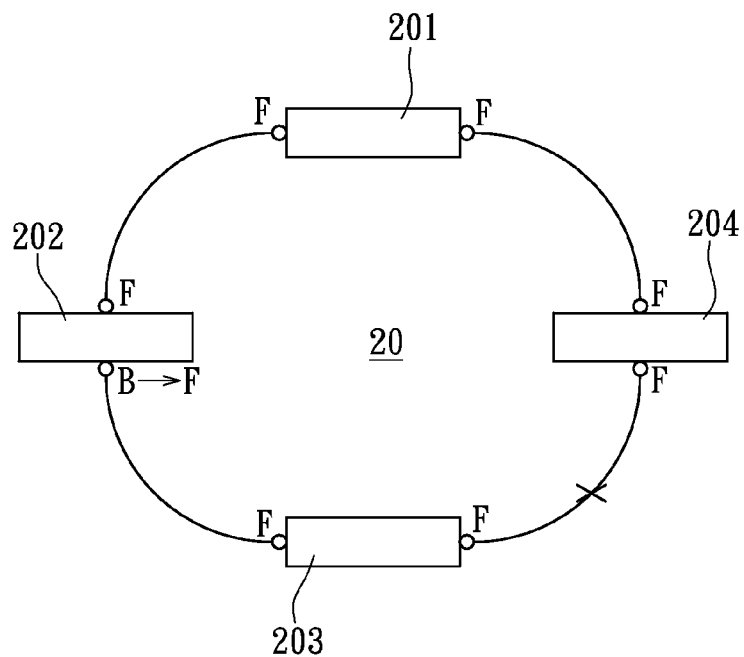
FIG. 2 shows a schematic diagram of a typical ring-type network.

Reference is made to FIG. 2 showing a schematic diagram of a typical ring-type network.

The shown ring-type network 20 includes a plurality of network nodes 201, 202, 203 and 204. The network node can be implemented as a network switch. The interconnected network nodes particularly form a ring. Each of the network nodes 201, 202, 203 and 204 includes two or more network connection ports, which are interconnected to form the ring-type network. Further, each of the network nodes 201, 202, 203 and 204 has a memory for storing the states of each port and the connected port.

When the ring-type network is established, each of the network nodes 201, 202, 203, 204 and its adjacent network node will exchange their information in order to define their initial port roles. According to one of the embodiments, the comparison of the connected ports' media access control (MAC) addresses is regarded as a reference to define the port roles. For example, based on the comparison, the largest value of the MAC addresses within the ring-type network 20 may be configured to a blocked port B. For example, since the network node 202 has two network connection ports connected with other nodes, one of the ports is initially defined as the blocked port B. The blocked port B stops forwarding packets. Except the blocked port B, other ports, as the forward ports F, should be capable of communication. By means of this mechanism, the ring-type network 20 may not produce broadcast storm while accomplishing the initialization.

Each of the network nodes 201, 202, 203, 204 within the ring-type network 20 shown in FIG. 2 connects to any terminal device via its installed device port. Thereby the network 20 provides a redundancy scheme for the terminal devices.

In an exemplary example based on the claimed mechanism, when any connection broken event occurs, the network nodes 203 and 204 next to the broken position will detect the event. In the meantime, the nodes 203 and 204 issues a line broken signal, and the signal is broadcasted to other nodes within the ring-type network 20. Since the network connection port of the network node 202 is initially defined as the blocked port B, it may be transformed to forward port F as the network meets connection broken. Therefore, the network packets may still be transmitted to the network node 203 next to the broken position. After the transformation, the nodes within the ring are capable of being communicated with each other without broadcast storm.

While the broken line is repaired, one of the network connection ports between the adjacent network nodes 203 and 204 is re-defined as the blocked port B, and the other port is as the forward port F. Under this mechanism, the other network nodes may not be affected, and the ring-type network 20 still operates as usual.

Figure 3:
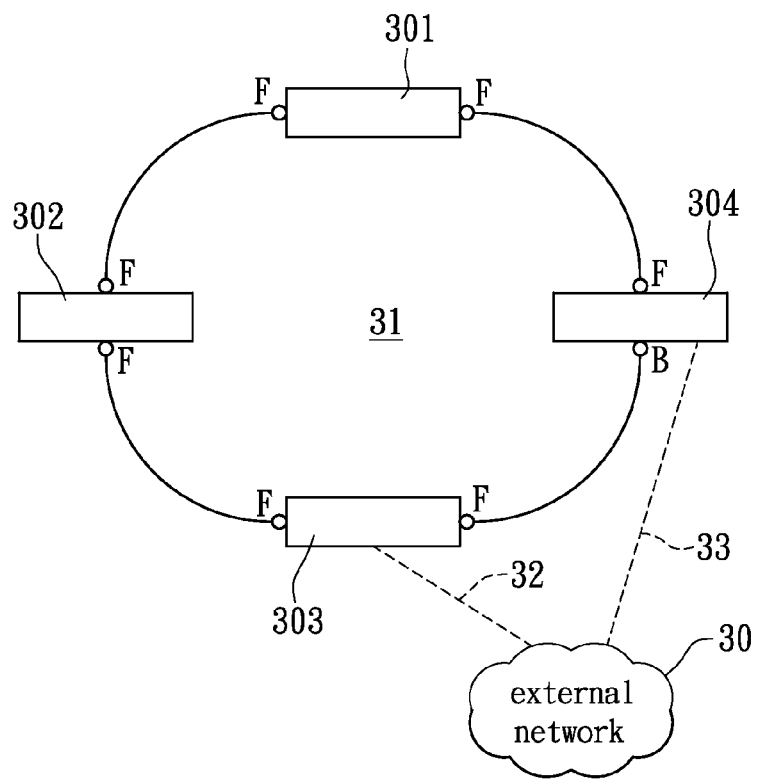
FIG. 3 schematically shows a connection between a ring-type network and an external network.

Reference is made to FIG. 3 schematically illustrating the connection between the ring-type network and an external network. A ring-type network 31 shown in the figure is formed with a plurality of network nodes 301, 302, 303 and 304. The network nodes 303 and 304 are in optional communication with the external network 30 via the connections 32 and 33 respectively. Exemplarily, the network connection port of the network node 304 is defined as the blocked port B, by which the network node 303 is connected.

The ring-type network 31 provides a redundancy mechanism for the external network 30. Two connections 32 and 33 are configured to connect the external network 30, and the connections 32 and 33 are mutual backup. If any connection fails, the related network node may detect the event. Meanwhile, the connected port will be re-defined and the initial connection may be switched to the other connection for backup. The ring-type network 31 provides a reliable connection for the external network 30 optionally by means of port definition. Users may stably access the inside the ring from the external network 30.

Based on the ring-type network system, the plurality of network nodes form a ring-type sub-network. The ring-type sub-networks are also interconnected with each other to form one ring-type network. This framework achieves an expandable ring-type network system since it may extend to other possible network structure.

First Embodiment

Figure 4:
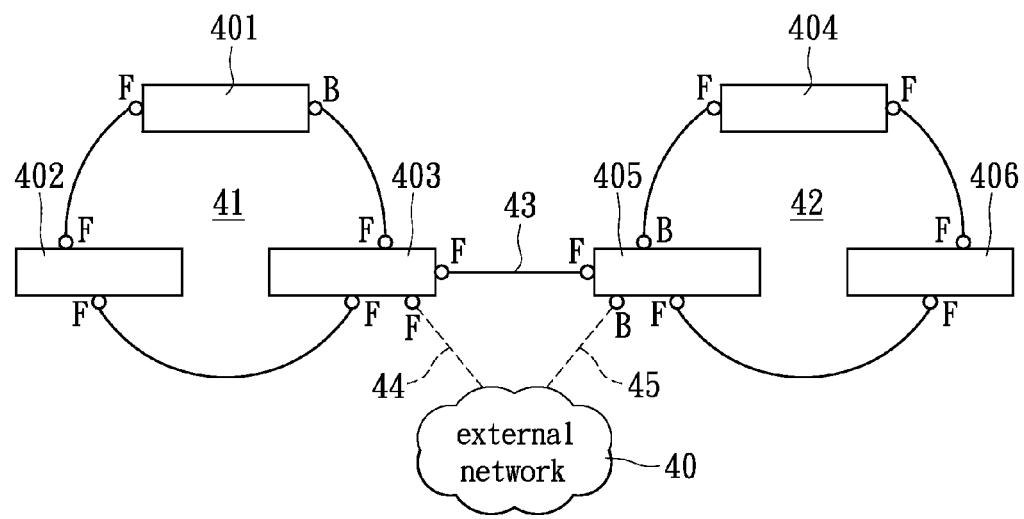
FIG. 4 schematically shows connections among two ring-type networks and an external network in accordance with the present invention.

FIG. 4 shows a schematic diagram of two ring-type networks in optional communication with an external network in one embodiment of the invention.

Figure shows two ring-type sub-networks 41, 42. The sub-network 41 is formed with network nodes 401, 402 and 403. The sub-network 42 includes network nodes 404, 405 and 406. The two sub-networks 41, 42 are interconnected via a connection 43 between the network node 403 and the network node 405. The nodes are interconnected via their network connection ports. It is worthy noting that the two network nodes 403, 405 used for establishing the connection are respectively belonging to the two sub-networks 41, 42. In particular, the network node may be implemented as a network switch, which is equipped with one or more device ports for connecting with the other types of network devices. The two different network switches belong to respective portions of different local area networks with variant network topologies.

In the current example, the ports of the network nodes 401, 402 and 403 within the sub-network 41 are defined as one blocked port B and some forward ports F. Based on the claimed mechanism, if any change occurs on any node or connection, the port roles of the ports will be re-defined in order to perform a fast convergence to a redundant networking environment. Therefore the redundancy mechanism is implemented in the ring-type network. Similarly, one network connection port of the ring-type sub-network 42 will be defined as the blocked port B, and the other ports are forward ports F.

If any network broken subject to failure of connection, failure of device, or connection modification detected by any network node, the network node may broadcast the network broken signal to other nodes in the same domain over the network. The related signal notifies the change of network topology. In the meantime, the network system initiates the mechanism of port redefinition in order to converge network for redundancy.

For example, if any broken or failure along the connection or device occurs, the blocked port may be transformed into forward port when every network node is notified. Therefore, the delivered network packet may avoid the broken or failure. Or alternatively, if it has any connection modification, such as adding or canceling one network node, the change may result in transforming the existed blocked port into forward port. Further, the port of any added node may be optionally defined as the blocked port or forward port.

The described pattern provides an expandable network framework since the two ring-type sub-networks 41, 42 are interconnection over the connection 43. Thus, the mechanism provides redundancy for the terminal devices in the network system, and also on the shown external network 40.

Furthermore, the shown external network 40 is connected to the sub-networks 41, 42 over two connections 44, 45 respectively. In which, the connection 44 is to bridge the network connection port of network node 403 and the external network 40, and the connection 45 is for the network node 405 and the external network 40. The connections 43, 44 and 45 also form a ring-type network system, which is adapted to the port definition mechanism in accordance with the claimed invention.

To sum up the above, every network connection port is initially defined at the moment of initializing the network system. One of the ports will be defined as blocked port (B), such as the port bridging the network node 405 and the external network 40, and the other port will be defined as forward ports (F). If the network meets any change of connection, such as one of the connections 43, 44, 45, the relevant network connection port will be re-defined for maintaining connectivity. According to the embodiment, the broken event may cause redefining the network connection port of the node 405, to the external network 40, from blocked port to forward port. Thus, users can access the terminal device within the sub-network 41 or sub-network 42 from the external network 40.

Second Embodiment

The expandable ring-type network system includes a plurality of network nodes. Each network node has at least two network connection ports connected to other network nodes. The interconnected network nodes form at least two ring-type sub-networks. The plural ring-type sub-networks further form the expandable ring-type network system. While the network system is initialized, the system will define one of the network connection ports within the domain to blocked port, and others to forward ports. If any change of connection occurs, the blocked port may be re-defined as the forward port for redundancy.

Figure 5:
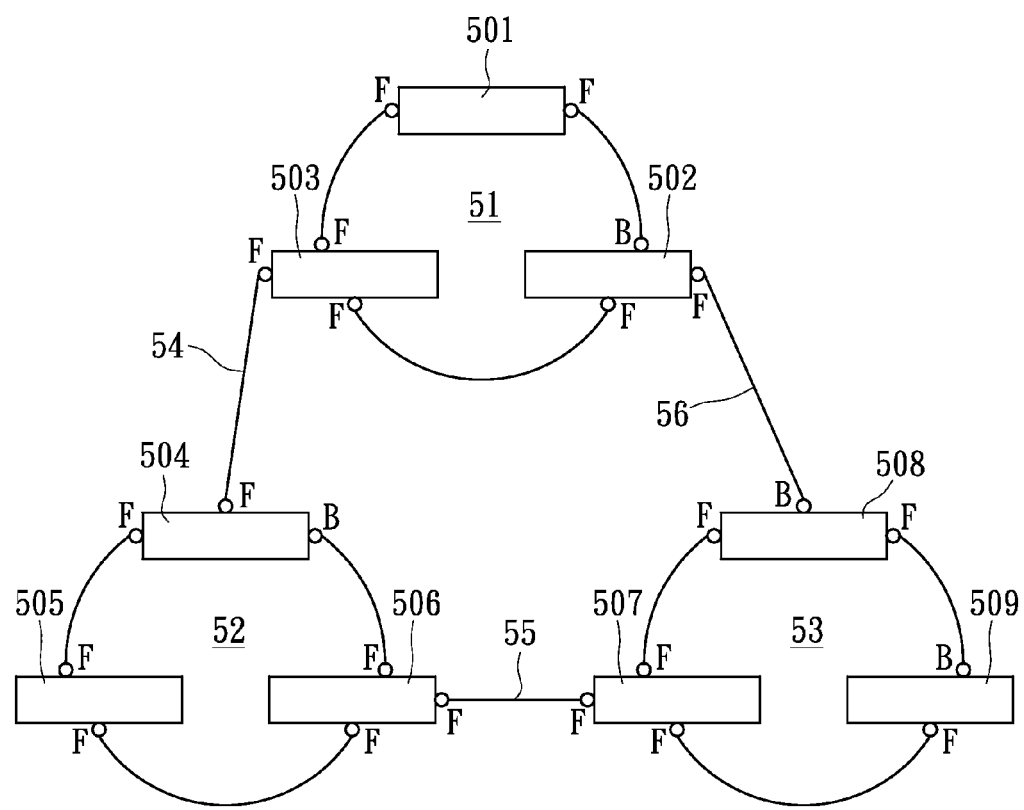
FIG. 5 schematically shows a networking framework of interconnected three ring-type networks in accordance with the invention.

FIG. 5 schematically describes an embodiment of the network framework having three ring-type networks.

This example shows three ring-type sub-networks 51, 52 and 53. The network nodes 501, 502, 503 form the sub-network 51, the network nodes 504, 505, 506 are for sub-network 52, and the network nodes 507, 508, 509 form the sub-network 53. A connection 54 connects the sub-network 51 and the sub-network 52. Connection 55 connects the sub-network 52 and the sub-network 53. Connection 56 connects the sub-network 53 and the sub-network 51.

The mentioned three ring-type sub-networks 51, 52 and 53 frame a network system. In which, the interconnected network connection ports among the three sub-networks 51, 52, 53 are separately defined as one blocked port B and some forward ports F. The port definition scheme may exclude the broadcast storm within a ring-type network, and provide redundancy mechanism as any change is occurred. The connections 54, 55, 56 among the sub-networks 51, 52, 53 form an expandable ring-type network.

Several network nodes operate as the nodes within the each sub-network 51, 52 and 53, and some nodes are also be the nodes for the expanded ring-type network. For example, the network node 502 has three network connection ports, in which, two of the ports are for the inner sub-network, and one is forward port F for connecting with other sub-networks. Further, one port of the network node 503 is defined as forward port F, by which, the network node 504 is connected. The network connection port of the network node 506 used for connecting to the network node 507 is forward port F. The port of the network node 508 for connecting to the network node 502 is a blocked port B.

Third Embodiment

Figure 6:
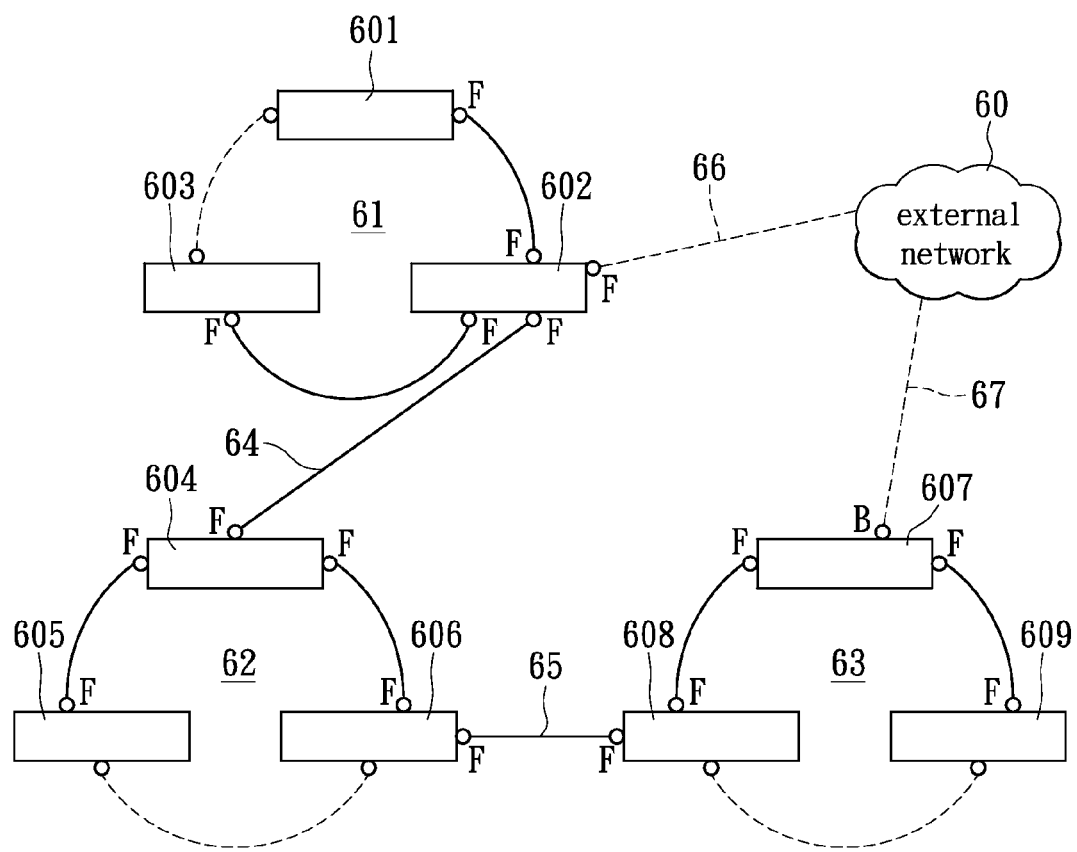
FIG. 6 shows a schematic diagram of three ring-type networks interconnected with an external network in accordance with the invention.

Rather than the network framework of FIG. 5, the framework shown in FIG. 6 provides three sub-networks connected to an external network 60. The three sub-networks 61, 62, 63, in this example, are not a typical ring-type network, but a linear-type network. The method is also adapted to the non-linear-type network, such as this linear-type network. However, the network connection ports of the network nodes within each of the sub-networks 61, 62, 63 may not be defined as one blocked port B, but all are forward ports F.

According to this embodiment, an external network 60 connects to the network over connections 66 and 67. More precisely, the external network 60 respectively connects to the ports of network node 602 and the network node 607. Over the connections 64, 65, 66, 67, a wide area ring-type network is formed. The redundancy mechanism in accordance with the invention is also applicable to the wide area network.

Within the wide area ring-type network, the network connection ports are initially defined as the blocked port or forward port based on a comparison of the media access control addresses thereof. Since the wide area network is a ring-type network, one defined blocked port is requisite. In this example, the blocked port is the network connection port, by which the network node 607 connects to the external network

60. When any change of connection between the network system and the external network 60 occurs, the redundancy mechanism will re-define the port roles of the network connection ports along the connections 64, 65, 66, 67. The blocked port may be re-defined as forward port in order to accomplish the redundancy.

A redundancy method for the above-mentioned expandable ring-type network system may be adapted to the described embodiments. The related steps in the method are made to FIG. 7.

In the beginning of the steps, such as step S701, it is to establish a network system with at least two ring-type sub-networks or linear-type sub-networks. The two or more sub-networks are interconnected to form the expandable network system. In one of the embodiments, the nodes within a sub-network may be unnecessary to link to each other as a typical ring, but be a network similar to the ring-type network having defined blocked port and forward ports. Simultaneously, the claimed network system connects to an external network via two connection ports.

Next, the step in the method is to initialize the network system, including the connection to the external network (step S703). The initialization defines the port roles of network connection ports of each node within each sub-network. One blocked port and plural forward ports correlated with the network connection ports are defined for each sub-network (step S705). Preferably, the comparison of the media access control addresses of the interconnected network connection ports among the nodes is the basis to define the port roles. The comparison may be acknowledged by all the nodes within the sub-network, therefore one blocked port and forward ports are subsequently defined. The port definition mechanism makes the network system provide the redundancy.

Furthermore, the sub-networks may form another one wide area ring-type network, including an external network, via the interconnected network nodes. Such as step S707, the wide area ring-type network has one blocked port and plural forward ports. The port definition is also performed on the network nodes among the sub-networks. Preferably, the ports connected to the external network and the ports between the sub-networks for the wide area network are initially defined as one blocked port and some forward ports. The further port redefinition scheme is used for providing redundancy if any connection changes. If the two ends of the wide area network are not interconnected, no blocked port is required.

Since the network system has been established, as step S709, the step in the method is to detect if there is any change over the connections according to the connection status of physical layer. In an exemplary example, a link status on a panel of network switch indicates the change. Failure of connection, failure of device, or connection modification may cause the change. In step S711, the step is to determine if there is any change during operation of the expandable network system.

If no change is detected, it means there is no failure of connection, failure of device, or connection modification, and the step goes to S711 continuously detecting the change. If any change of connection is detected, it firstly determines the change is within the sub-network, among the sub-networks, or on the network node connected to the external network (step S713).

The information of the change may be broadcasted to every correlative network node. The related network connection ports will be re-defined. In step S715, the re-defined ports may be at the network nodes within a sub-network, or the nodes over the connections among the sub-networks. The redundancy is accomplished (step S717).

Figure 7:
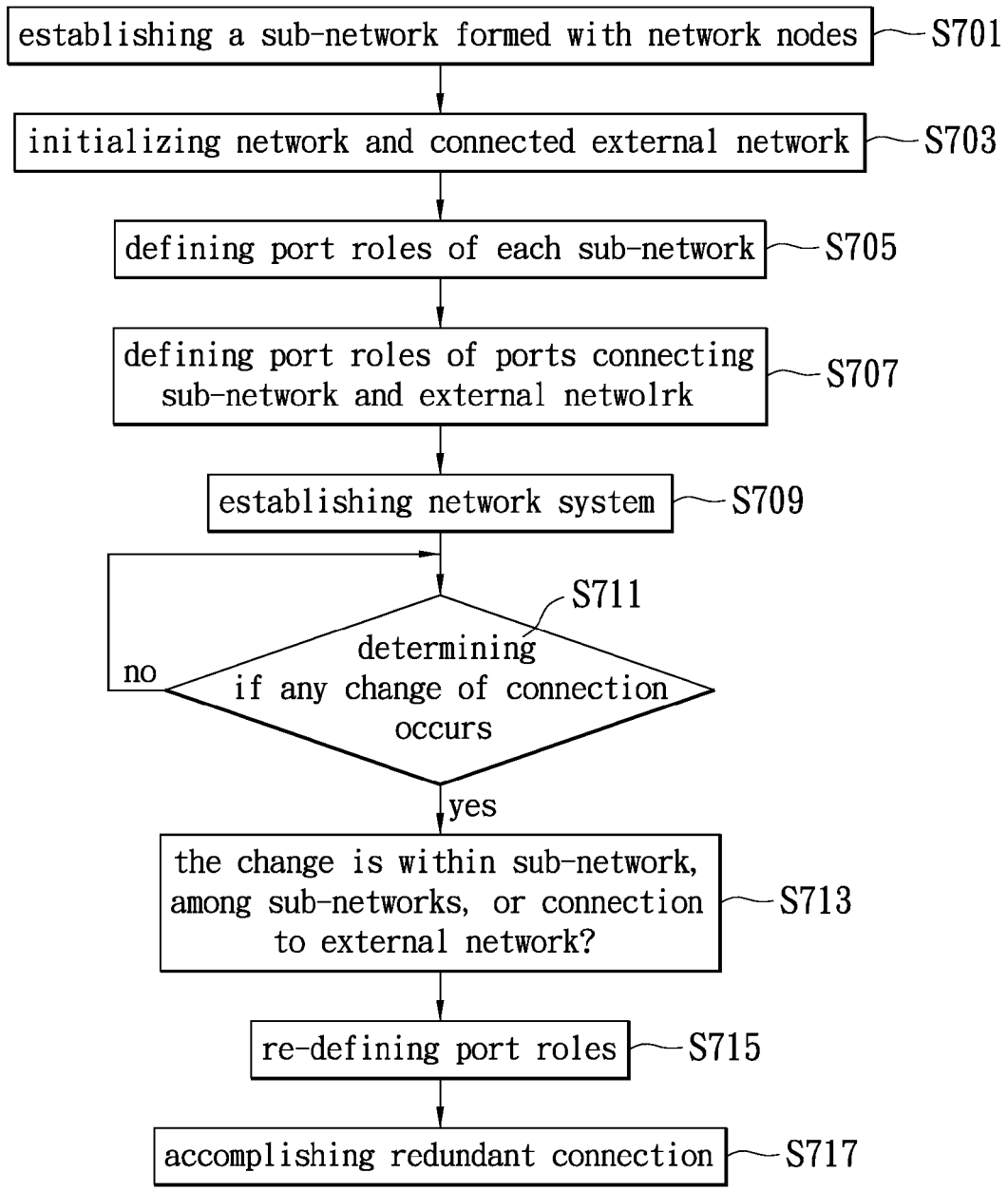
FIG. 7 illustrates a flow chart of redundancy of the expandable ring-type network according to the invention.

To sum up the above description, by means of the method described in FIG. 7, the port definition mechanism is performed on the each ring-type sub-network, or the ring-type network formed with a plurality of sub-networks. The invention achieves a fast convergence and redundancy. The redundancy benefits the devices within the claimed network system, and the external network thereto.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. An expandable network system, comprising:
a plurality of network nodes, wherein each network node has at least two network connection ports connected to other one or more network nodes; and
at least two sub-networks, wherein the sub-network is a ring-type or linear-type sub-network formed with interconnecting the plurality of network nodes;
wherein, the each network connection port of each network node of one sub-network is initially defined as a specific port role, such that the port role of the network connection port is able to be redefined as the network connection is changed,
further, the two different sub-networks are connected via two network nodes, wherein the two network nodes respectively belong to the two sub-networks and are interconnected with the two sub-networks.

2. The network system of claim 1, wherein the plurality of network connection ports of each network node of the sub-network are defined as one blocked port and some plurality of forward ports; and the network connection port of the network node for interconnecting the sub-networks are defined as one blocked port and some plurality of forward ports.

3. The network system of claim 2, wherein the port roles, including the blocked port and the forward port, for the network connection ports are defined based on the each port's media access control address as initializing the network system.

4. The network system of claim 3, wherein, the each network connection port's physical layer is a point of reference to determine if the network connection is changed.

5. The network system of claim 1, wherein the network node is a network switch.

6. The network system if claim 1, wherein network node interconnected with other sub-network serves as part of this sub-network 7. The network system of claim 1, wherein the each network node includes at least one device port connected to a network device.

8. The network system of claim 1, wherein expandable the network system includes two network connection ports in optional communication with an external network.

9. The network system of claim 8, wherein the port roles of the two network connection ports are defined as initializing the network system; and the port roles of the two network connection ports are redefined when the connection between the network and the external network is changed.

10. A redundancy method adapted to the expandable network system of claim 1, the method comprising:
establishing at least two sub-networks formed with a plurality of network nodes, and the sub-networks are interconnected to form an expandable ring-type or a linear-type network system;

initializing the expandable network system;

defining a port role of each network connection port of the plurality of network nodes within each sub-network;

defining port role of each network connection port of one or more network nodes interconnected among the sub-networks;

determining whether or not any connection between any two network nodes is changed after establishing the network system;

if no connection is changed, continuously the determining step;

if any connection is changed, determining the changed connection is located at the network node within the sub-network or between the sub-networks;

re-defining the port role of each network connection port within the sub-network or between the sub-networks having the change after broadcasting the change to each network node; and accomplishing a redundant connection.

11. The method of claim 10, wherein the network connection ports of each sub-network are defined as one blocked port and a plurality of forward ports; the two sub-networks form one network, and the port roles of the network connection ports of the network nodes interconnected with the sub-networks are defined as one blocked port and plural forward ports.

12. The method of claim 10, wherein the network node is a network switch having at least two network connection ports connected with the network nodes.

13. The method of claim 12, wherein two of the network switches belong to two local area networks with two different network topologies.

14. The method of claim 12, wherein the each network switch has one or more device ports used for connecting to other network devices.

15. The method of claim 10, wherein the change of connection means failure of connection, failure of device, or connection modification.

16. The method of claim 15, wherein the definition of the blocked port or the forward port as initializing the network system when the connection is changed is based on comparison of the media access control addresses of the interconnected network connection ports.

17. The method of claim 16, wherein the change of connection is detected by referring to the physical layer of each network connection port.

18. The method of claim 10, wherein the two network nodes respectively belong to two sub-networks are interconnected with the two sub-networks.

19. The method of claim 10, wherein the expandable network system having at least two sub-networks further comprises an external network, and the network system connects to the external network via two network connection ports.

20. The method of claim 19, wherein the port roles of the two network connection ports are defined as initializing the network system; and the port roles are re-defined as the connection between the network system and the external network is changed.

* * * * *